United States Patent Office 3,558,525
Patented Jan. 26, 1971

3,558,525
CATALYST MANUFACTURE METHOD
Edward D. Noble, San Rafael, Calif., assignor to Chevron Research Company, San Francisco, Calif., a corporation of Delaware
No Drawing. Filed Oct. 17, 1968, Ser. No. 768,498
Int. Cl. B01j 11/40
U.S. Cl. 252—453                                 7 Claims

ABSTRACT OF THE DISCLOSURE

Method of calcining a hydrogel containing catalyst component precursors, to impart improved properties to the finished catalyst, comprising accomplishing the calcining in a calcination vessel supplied during at least a major portion of the calcination time with not more than 3 cubic feet of purge gas per hour per pound of catalyst.

INTRODUCTION

This invention relates to catalyst manufacture, and more particularly to an improved method for manufacturing hydrocarbon conversion catalysts.

PRIOR ART

It is known that a catalyst, or a catalyst component such as alumina or silica-alumina, may be prepared by forming a hydrogel slurry containing a hydrous oxide precursor, or hydrous oxide precursors, of the final catalyst, or catalyst component, and that the hydrogel slurry may be partially dried to produce a hydrogel containing a precursor or precursors of the final catalyst or catalyst component. It is also known that this hydrogel may be calcined to cause it to develop structural strength, to convert hydroxides contained therein to oxides, and to activate it for catalyst use. Those skilled in the art will be aware of many prior art disclosures of the aforesaid procedures. For example, one such disclosure is found in Joseph Jaffe U.S. Pat. 3,280,040.

It is also known that in many cases it is desirable to modify the physical characteristics of catalysts prepared by following the aforesaid procedures, for example particle density, average pore diameter, and porosity. Various methods for modifying certain individual physical characteristics of catalysts are known; however, there has been a remaining need for a method, if one could be devised, for producing catalysts or catalyst components which would generally employ the aforesaid procedures but which would result in catalysts or catalyst components having lower particle densities, larger average pore diameters, and greater porosities than heretofore obtainable with the aforesaid procedures. It is an object of the present invention to provide such a method.

STATEMENT OF INVENTION

In accordance with one embodiment of the present invention there is provided, in a process for manufacturing a hydrocarbon conversion catalyst or catalyst component comprising alumina, which process comprises forming a hydrogel containing a precursor of alumina, and calcining said hydrogel to produce the final catalyst or catalyst component, the improvement which comprises accomplishing said calcining in a calcination vessel supplied during at least a major portion of the calcination time with not more than 3 cubic feet of purge gas per hour per pound of catalyst.

In accordance with a further embodiment of the process of the present invention said catalyst comprises a Group VIII metal or metal compound hydrogenating component, and said hydrogel contains a precursor of said component.

In accordance with additional and separate embodiments of the process of the present invention, in that process:

(1) Said catalyst comprises both a Group VI and a Group VIII metal or metal compound hydrogenating component, and said hydrogel contains precursors of both of said components.

(2) Said catalyst or catalyst component further comprises silica, and said hydrogel contains a precursor of silica.

(3) Said hydrogel and said catalyst contain particles of crystalline zeolitic molecular sieve dispersed therethrough.

(4) Said hydrogel and said catalyst contain particles of a layered clay-type crystalline aluminosilicate dispersed therethrough.

(5) Said catalyst comprises a Group VIII metal or metal compound hydrogenating component, and following said calcining said catalyst is thermactivated at a temperature in the range 1200° to 1600° F. for 0.25 to 48 hours in an oxygen-containing gas stream.

Any conventional calcination conditions, excepting purge gas rate, are satisfactory for use in the process of the present invention. Generally such conditions will include calcination temperatures in the range 400° to 1100° F., preferably 700° to 1100° F., and calcination times of 1 to 20 hours, preferably 1 to 10 hours, although those skilled in the art will recognize when certain time-temperature combinations outside these ranges may be useful in preparing certain types of catalysts.

It has been found that the process of the present invention is highly effective in enabling a wide variety of catalysts and catalyst components to be produced having lower particle densities, larger average pore diameters and greater porosities than would result from prior art calcination methods applied to hydrogels of the type contemplated herein. For example, the process of the present invention is effective in achieving the indicated results when employed during manufacture, via hydrogel intermediates, of catalysts and catalyst components which include those listed below, as such or with the hydrogenating components being in the form of metal compounds. In each case crystalline zeolitic molecular sieves or layered clay-type crystalline aluminosilicates, or both, may be present.

| | |
|---|---|
| $Al_2O_3$ | $SiO_2Al_2O_3Co$ |
| $SiO_2Al_2O_3$ | $SiO_2Al_2O_3NiW$ |
| $SiO_2Al_2O_3TiO_2$ | $SiO_2Al_2O_3NiMo$ |
| $SiO_2Al_2O_3ZrO_2$ | $SiO_2Al_2O_3TiO_2NiW$ |
| $Al_2O_3Pt$ | $SiO_2Al_2O_3TiO_2NiMo$ |
| $Al_2O_3Pd$ | $SiO_2Al_2O_3ZrO_2NiW$ |
| $SiO_2Al_2O_3Ni$ | $SiO_2Al_2O_3ZrO_2NiMo$ |

Those skilled in the art will recognize that the hydrogel intermediate of the final catalyst contains, at the beginning of the calcining step, a large amount of water, and that as a large proportion of this water is driven out of the hydrogel during calcining it is carried away under conventional methods by a stream of purge gas which conventionally is air but which could be any carrier gas capable of removing the water vapor from the calcining vessel. In the process of the present invention it is necessary that an atmosphere develop around and adjacent to the hydrogel that has a relatively high moisture content, compared with prior art calcining methods. This is accomplished by maintaining the flow rate of purge gas supplied to the calcining vessel at not more than 3 cubic feet per hour per pound of catalyst during a major portion of the calcination time. In a preferred manner of operation the calcining vessel is sealed and the purge gas flow rate is essentially zero cubic feet per hour per pound of catalyst.

It has been found that high-temperature steam flowing during calcining at a rate greater than 3 cubic feet per hour per pound of catalyst, rather than merely a moisture-laden atmosphere as provided by the process of the present invention, has beneficial effects on certain catalyst or catalyst component physical characteristics, but results in a catalyst or catalyst component having unacceptable physical strength. To the contrary, the process of the present invention results in a catalyst or catalyst component having acceptable physical strength.

EXAMPLES

The following examples will serve to aid an understanding of the process of the present invention, but are not intended to limit the scope thereof.

Example 1

Two catalysts, Catalysts A and B, each containing the following components, were prepared: NiO, $WO_3$, $SiO_2$, $Al_2O_3$, $TiO_2$. The catalysts were prepared by cogelation of precursor compounds of the final catalyst components to produce a hydrogel, by drying the hydrogel, and by calcining the dried hydrogel as described below.

The dried hydrogel was divided into two portions, Portion A, which was calcined in the presence of a purge gas according to conventional methods to produce Catalyst A, and Portion B, which was calcined according to the process of the present invention to produce Catalyst B. The calcination conditions and resulting catalyst physical characteristics were as follows:

|  | Portion A | Portion B |
| --- | --- | --- |
| Calcination conditions: |  |  |
| Calcination temperature, °F | 400–950 | 400–950 |
| Calcination time, hours | 10 | 10 |
| Purge gas | (¹) | (²) |
| Purge gas rate, ft.³/hr./lb | 11 | 0 |
|  | Catalyst A | Catalyst B |
| Resulting catalyst physical characteristics: |  |  |
| Surface area, M²/g | 322 | 280 |
| Pore volume, cc./g | 0.304 | 0.344 |
| Particle density, g./cc | 1.74 | 1.63 |
| Porosity, cc./cc | 0.53 | 0.56 |
| Pore diameter, average, Angstroms | 38 | 49 |

¹ Air.  ² None.

Example 2

Two catalysts, catalysts C and D, each containing the following components, were prepared: F, NiO, $MoO_3$, $Al_2O_3$, $TiO_2$, $P_2O_5$. The catalysts were prepared by cogelation of precursor compounds of the final catalyst components to produce a hydrogel, by drying the hydrogel, and by calcining the dried hydrogel as described below.

The dried hydrogel was divided into two portions, Portion C, which was calcined in the presence of a purge gas according to conventional methods to produce Catalyst C, and Portion D, which was calcined according to the process of the present invention to produce Catalyst D. The calcination conditions and resulting catalyst physical characteristics were as follows:

|  | Portion C | Portion D |
| --- | --- | --- |
| Calcination conditions: |  |  |
| Calcination temperature, °F | 400–900 | 400–900 |
| Calcination time, hours | 8 | 8 |
| Purge gas | (¹) | (²) |
| Purge gas rate, ft.³/hr./lb | 11 | 0 |
|  | Catalyst C | Catalyst D |
| Resulting catalyst physical characteristics: |  |  |
| Surface area, M²/g | 234 | 167 |
| Pore volume, cc./g | 0.440 | 0.516 |
| Particle density, g./cc | 1.39 | 1.31 |
| Porosity, cc./cc | 0.61 | 0.675 |
| Pore diameter, average, Angstroms | 75 | 124 |

¹ Air.  ² None.

Example 3

Two Catalysts, Catalysts E and F, each containing the following components, were prepared: NiO, $MoO_3$, $Al_2O_3$, $TiO_2$, $P_2O_5$. The catalysts were prepared by cogelation of precursor compounds of the final catalyst components to produce a hydrogel, by drying the hydrogel, and by calcining the dried hydrogel as described below.

The dried hydrogel was divided into two portions, Portion E, which was calcined in the presence of a purge gas according to conventional methods to produce Catalyst E, and Portion F, which was calcined according to the process of the present invention to produce Catalyst F. The calcination conditions and resulting catalyst physical characteristics were as follows:

|  | Portion E | Portion F |
| --- | --- | --- |
| Calcination conditions: |  |  |
| Calcination temperature, °F | 400–900 | 400–900 |
| Calcination time, hours | 8 | 8 |
| Purge gas | (¹) | (²) |
| Purge gas rate, ft.³/hr./lb | 11 | 0 |
|  | Catalyst E | Catalyst F |
| Resulting catalyst physical characteristics: |  |  |
| Surface area, M²/g | 311 | 248 |
| Pore volume, cc./g | 0.484 | 0.581 |
| Particle density, g./cc | 1.37 | 1.24 |
| Porosity, cc./cc | 0.66 | 0.71 |
| Pore diameter, average, Angstroms | 62 | 94 |

¹ Air.  ² None.

Example 4

Three additional hydrogel portions, having the compositions of the hydrogel portions of Examples 1, 2 and 3, respectively, are perpared, and are separately calcined at the same temperatures and for the same lengths of time as in Examples 1, 2 and 3, respectively, while passing air as a purge gas through the calcining vessel at 5 cubic feet per hour per pound of hydrogel. In each case the values of final catalyst surface area, pore volume, particle density, porosity and pore diameter are unacceptably close to the values resulting from the purge gas rate, 11 cubic feet per hour per pound of hydrogel, of Examples 1, 2 and 3.

Example 5

Three additional hydrogel portions, having the compositions of the hydrogel portions of Examples 1, 2 and 3, respectively, are prepared, and are separately calcined at the same temperatures and for the same lengths of time as in Examples 1, 2 and 3, respectively, while passing air as a purge gas through the calcining vessel at 2 cubic feet per hour per pound of hydrogel. In each case the values of final catalyst surface area, pore volume, particle density, porosity and pore diameter, while not quite as desirable as those resulting from use of no purge gas at all during calcining, are close thereto, and are entirely acceptable.

CONCLUSIONS

The process of the present invention has a substantial effect on various catalyst physical characteristics, compared with use of a conventional calcining procedure using a high purge gas rate in the calcination vessel, as better may be appreciated visually by plotting the results of Example 1 herein, as follows:

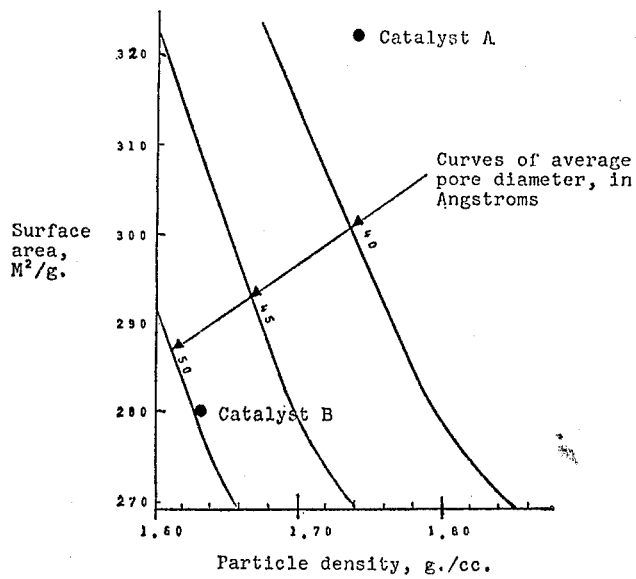

A similarly visually dramatic comparison between Catalysts C and D of Example 2, and Catalysts E and F of Example 3, may be plotted using the data in those examples.

Although only specific embodiments of the process of the present invention have been described, numerous variations can be made in these embodiments without departing from the spirit of the invention, and all such variations that fall within the scope of the appended claims are intended to be embraced thereby.

What is claimed is:

1. In a process for manufacturing a hydrocarbon conversion catalyst or catalyst component comprising alumina, which process comprises forming a hydrogel containing a precursor of alumina, and calcining said hydrogel to produce the final catalyst or catalyst component, the improvement which comprises accomplishing said calcining in a calination vessel supplied during at least a major portion of the calcination time with not more than 3 cubic feet of purge gas per hour per pound of catalyst.

2. A process as claim 1, wherein said catalyst comprises a Group VIII metal or metal compound hydrogenating component, and wherein said hydrogel contains a precursor of said component.

3. A process as in claim 2, wherein said catalyst comprises a Group VI metal or metal compound hydrogenating component, and wherein said hydrogel contains a precursor of said component.

4. A process as in claim 1, wherein said catalyst or catalyst component further comprises silica, and wherein said hydrogel contains a precursor of silica.

5. A process as in claim 1, wherein said hydrogel and said catalyst contain particles of crystalline zeolitic molecular sieves dispersed therethrough.

6. A process as in claim 1, wherein said hydrogel and said catalyst contain particles of a layered clay-type crystalline aluminosilicate dispersed therethrough.

7. A process as in claim 2, with the additional step, following said calcining, of thermactivating said catalyst at a temperature in the range 1200° to 1600° F. for 0.25 to 48 hours in an oxygen-containing gas stream.

References Cited

UNITED STATES PATENTS 3,280,040 10/1966 Jaffe _____ 252—453X
3,411,888 11/1968 Westerland et al. ____ 252—455X DANIEL E. WYMAN, Primary Examiner C. F. DEES, Assistant Examiner U.S. Cl. X.R.
252—455, 458, 459